United States Patent

[11] 3,630,138

[72] Inventors: Jens Martin Anders Marcussen, West Haven; Kenneth Martin Rosen, Guilford, both of Conn.
[21] Appl. No.: 84,090
[22] Filed: Oct. 26, 1970
[45] Patented: Dec. 28, 1971
[73] Assignee: United Aircraft Corporation, East Hartford, Conn.

[54] AIR-CONDITIONING SYSTEM WITH POSITIVE PRESSURIZATION
14 Claims, 5 Drawing Figs.

[52] U.S. Cl. .................................................. 98/1.5, 62/402
[51] Int. Cl. .......................................................... B64d 13/04
[50] Field of Search ........................................... 98/1.5; 62/401, 402

[56] References Cited
UNITED STATES PATENTS
3,192,848 7/1965 Townsend .................... 98/1.5
3,367,256 2/1968 Townsend .................... 98/1.5

Primary Examiner—Meyer Perlin
Attorney—Vernon F. Hauschild

ABSTRACT: An air-conditioning system in which conditioned air is being provided to a compartment by a choked air-conditioning system having minimum and maximum mass flow rates and wherein an undersized capacity fan operating in a pressure drop condition is placed in the outlet of the compartment to insure compartment pressurization despite leakage within the anticipated range within the operational flow range of the air conditioner, and which fan will operate to create a pressure rise to pump air through the compartment upon discontinued use of the air-conditioning system, and further, wherein a pressure relief valve is utilized in parallel flow relation with the fan to protect compartment structural integrity and to maintain compartment pressure changes within the limits of human comfort.

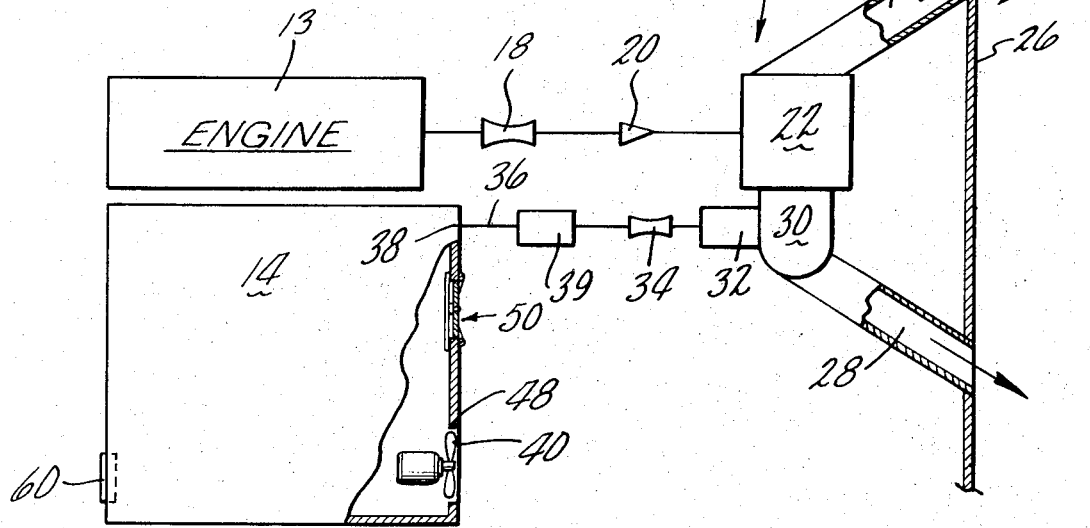
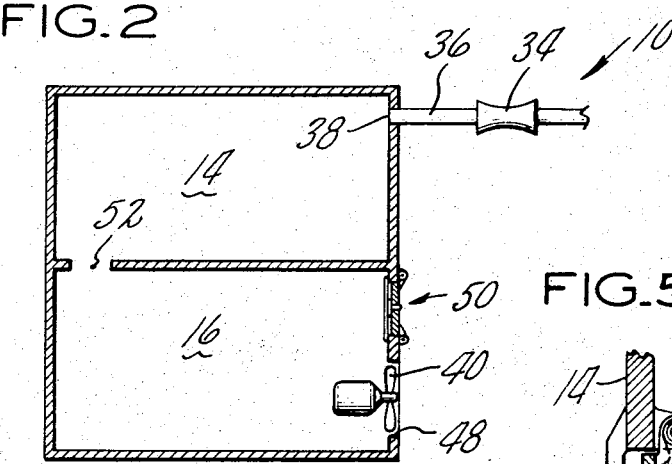
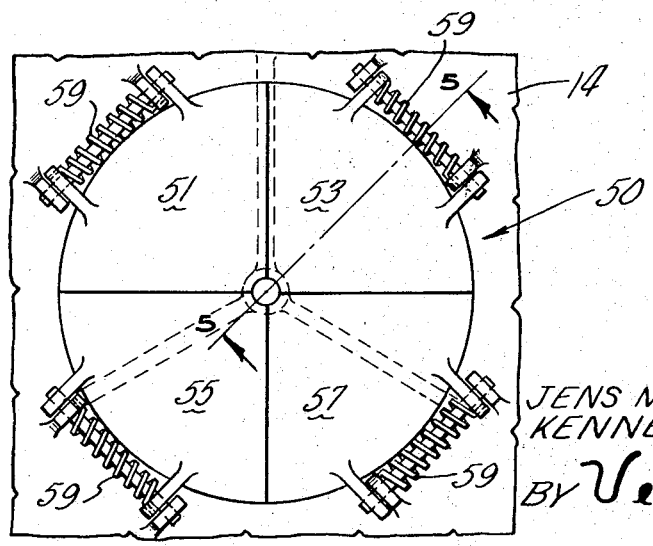
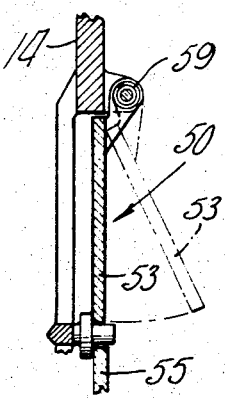

AIR-CONDITIONING SYSTEM WITH POSITIVE PRESSURIZATION

BACKGROUND OF THE INVENTION

1. Field of Invention

This invention relates to air-conditioning systems and more particularly to air-conditioning systems which are intended to be operated in hostile atmospheres and which should therefore be internally positively pressurized to insure that there is no ingestion of debris or fumes into the air-conditioned compartment and, preferably, to insure that conditioned air being exhausted from the first pressurized compartment be utilized in cooling an adjacent pressurized compartment, and wherein pressure relief provisions are made to safeguard the structural integrity of the compartments being air-conditioned and to maintain compartment pressure changes within the limits of human comfort.

2. Description of the Prior Art

In the air-conditioning art it is conventional to provide a source of pressurized air for air-conditioning a compartment, whether heating, or cooling or both, which has sufficient flow capacity that system leakage is not a major problem. There are no known systems which are capable of providing positive pressurization in an air-conditioned system which is subject to an undetermined amount of leakage.

SUMMARY OF THE INVENTION

A primary object of the present invention is to provide an air-conditioning system which is capable of providing the desired degree of air-conditioned compartment pressurization without regard to anticipated system leakage.

A further object of the invention is to integrate a standard compartment pressurization and air-conditioning system, with its inherent capability to create a pressure rise within the compartment, together with an undersized exhaust fan, with its inherent capability to create a pressure rise, whereby the resultant system produces a pressurized compartment throughout the operating range of the supply source when the fan and air-conditioning system are both operating, and will also produce a minimum predetermined mass flow of air through the compartment when the fan alone is operating.

In accordance with the present invention, a choked air-conditioning unit, that is air-conditioning unit whereby the mass flow is unaffected by pressure variation downstream thereof, and is responsive to pressure upstream thereof only, is utilized to provide conditioned air to a compartment at a capacity range between maximum and minimum mass flow rates and wherein an undersized fan, that is, a fan which is not capable of pumping at as high a flow rate as the air-conditioning unit system rate, is placed in the system outlet to establish a pressure drop thereacross and hence a pressure buildup upstream thereof to pressurize the compartment of interest.

A further feature of our invention is to provide the secondary advantage that the fan serves to cause the conditioning air from a first compartment to flow through a second compartment joined thereto.

In accordance with a further aspect of the present invention, to preserve the structural integrity of the compartment being air-conditioned, such as an aircraft canopy, pressure relief means are provided to insure that the pressure within the chamber does not exceed a predetermined limit and to maintain compartment pressure changes within the limits of human comfort.

DESCRIPTION OF THE DRAWINGS

FIG. 1 is a showing of a typical air-conditioning system utilizing our invention.

FIG. 2 is a showing of a modification of our invention.

FIG. 4 is a showing of the pressure relief valve of the system.

FIG. 5 is a cross-sectional view taken along line 5—5 of FIG. 4.

DESCRIPTION OF THE PREFERRED EMBODIMENT

Figure 3:
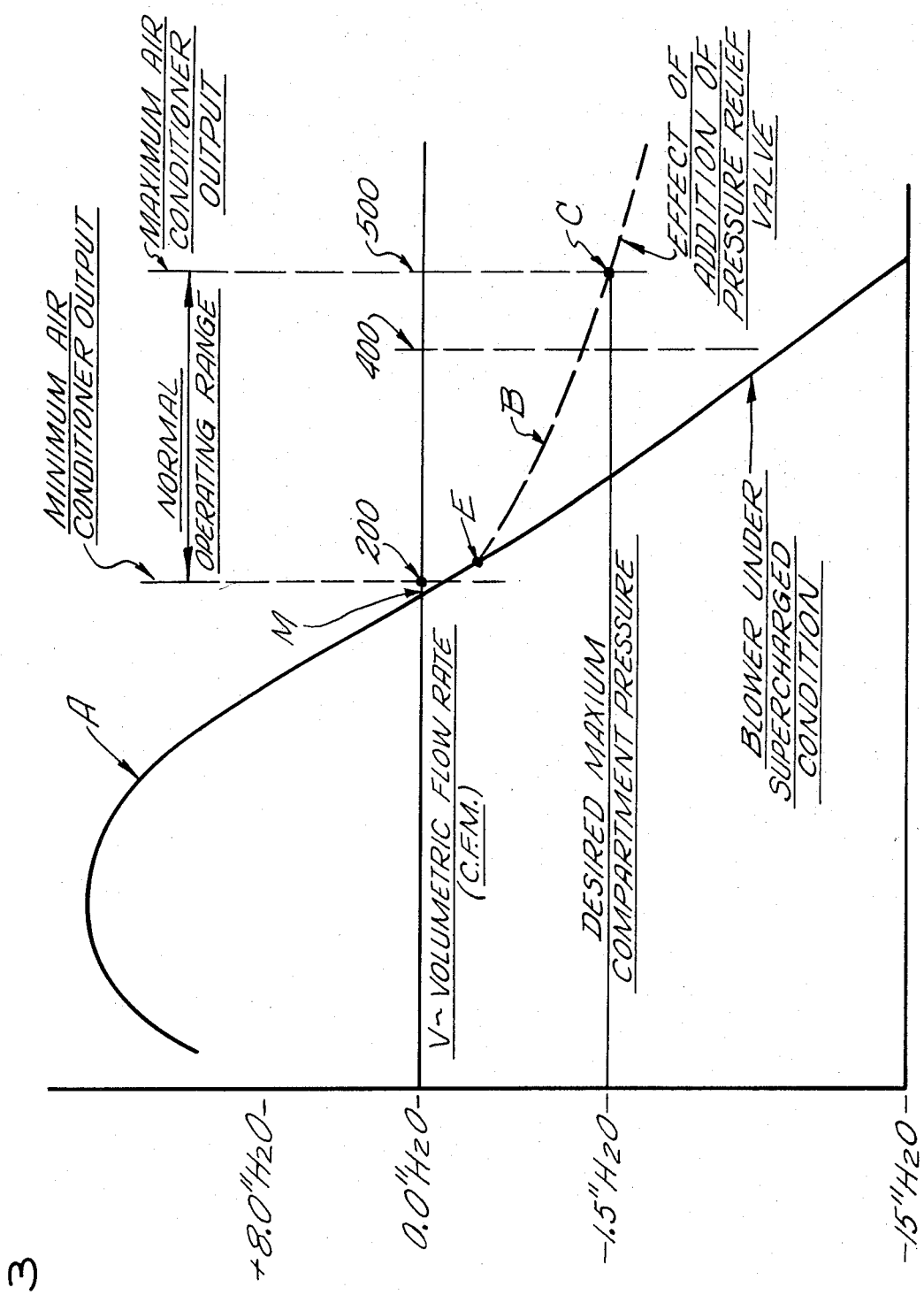
FIG. 3 is a graphic representation of the operation of the air-conditioning system utilizing our invention.

It is deemed advisable to preface the description by pointing out the fact that our invention is a combination of known parts used in a manner which is contradictory to their normal operation and function. It is also deemed important to first describe the theory of operation of our device.

It is important to note that the elements shown and described in combination are of a type which exhibits opposed operating characteristics when found in their usual, independent environments. The embodiment depicted and described requires an interfacing between these component part characteristics to specifically relate their operating values so as to meet particular system requirements.

Conventionally, an air-conditioning system provided heated or cooled, dehumidified air to occupants of a compartment. By restricting the exhaust outlet of the compartment, a pressure rise can be created to achieve a pressurized compartment. This is one of our system requirements. In apparent contradiction, a fan is located in the exhaust outlet which will be in constant operation and will operate in a pressure drop condition during air conditioner operation to produce compartment pressurization and will also provide a minimum mass airflow through the orifice upon discontinued operation of the air conditioner. The contradiction arrives in that a fan normally operates to create a pressure rise and does not operate with a pressure drop thereacross to exhaust air to an ambient area from a pressurized area. A third requirement or constraint upon the final system is for operation below a predetermined compartment pressure level for structural integrity purposes.

It is the teaching of this invention to combine a pressure-creating system with a fan such that the fan is forced to operate in a pressure drop condition to continuously pressurize the compartment within the normal operating range of the air-conditioning system. The fan size is chosen to produce zero pressure rise thereacross at the point of minimum air conditioner system airflow. When the air conditioner is inoperative or disabled due to damage to it or to the compartment, the fan operation will then function to produce a pressure rise as similar to a standard operating fan, and will continue to pass a predetermined air mass through the compartment.

Referring to FIG. 1 we see air-conditioning system 10 mounted in an aircraft 12 and using aircraft jet engine 13 as its pressure source through compressor bleed operation. Air-conditioning unit 10 serves to provide selectively conditioned air, whether for cooling or heating, to compartment 14. The compressor bleed air from engine 13 passes through flow-limiting venturi 18, for engine protection, and one-way check valve 20 to conventional heat exchanger mechanism 22. Mechanism 22 receives air from atmosphere through duct 24, which communicates with the atmosphere through aircraft nacelle skin 26, and discharges air back to atmosphere through duct 28. Turbine 32, driving conventional fan 30, expands the engine air through choked nozzle 34 before passing it on to water separator 39 and compartment 14. Choked nozzle 34 is preferably within the turbine 32 and causes air-conditioning system 10 to operate as a choked system and therefore be responsive to the pressure of the air from engine 13 only and completely independent of pressure variation downstream thereof, for example, the pressure within compartment 14. The conditioned air, after passing through choked nozzle 34 passes through conduit 36, water separator 39, and compartment inlet orifice 38 into compartment 14 to provide conditioned air to that compartment.

Air-conditioning system 10 may be of the type more fully described in a publication entitled "Aerospace Applied Thermodynamics Manual" developed by SAE Committee AC-9, Aircraft Environmental Systems, and published by the Society of Automotive Engineers, 2 Pennsylvania Plaza, New York, N.Y.

Engine 13 is preferably of the turbine type and may be of the type more fully described in U.S. Pat. Nos. 2,711,371 and 2,474,367.

By compressor bleed operation, engine 13 is capable of pumping conditioned air through system 10 between maximum and minimum flow rate limits.

In the environment in which our air-conditioning system is going to be used, it is desirable that compartment 14 be pressurized at all times to insure that fumes and other debris from the hostile exterior atmosphere are not ingested into compartment 14, but that all leakage be in the opposite direction, that is, from the compartment to atmosphere. Compartment 14 could well be a pilot canopy area and fumes and dust could be injurious to the pilot or passengers. To insure positive pressurization within compartment 14, an undersized fan 40 is positioned in compartment outlet orifice 48 and is of selected flow capacity as related to and preferably less than the minimum mass flow rate of air-conditioning system 10.

Since air-conditioning system 10 is providing conditioned air to the compartment 14 at a faster rate than fan 40 can pump that air out of the compartment, a pressure drop is experienced across undersized fan 40 and fan 40 accordingly serves to insure positive pressure within compartment 14 at all times, without respect to normal amounts of leakage from compartment 14. Due to the pressure drop condition of fan 40, the fan is considered to be operating in a supercharged condition.

It is a feature of our invention that desired volumes of conditioned air are passed through the compartment by our air-conditioning system at desired rates, despite the fact that the compartment is not absolutely airtight but is experiencing leakage within an anticipated compartment leakage range. If, however, extreme compartment leakage is encountered, for example, through a large hole in the compartment wall, fan 40 will experience zero pressure difference thereacross and will pump at a minimum system flow rate to the described hereinafter in connection with FIG. 3.

Pressure relief valve 50 is positioned in parallel flow relation to fan 40 in the wall of compartment 14 to insure that the degree of pressurization within compartment 14 does not exceed a preselected limit which would challenge the structural integrity of compartment 14. Valve 50 also serves to maintain compartment pressure changes within the limits of human comfort.

In our air-conditioning system 10 it is important to note that air-conditioning unit 13–34, which provides conditioned air to compartment 14, operates in a choked condition due to the presence of chocked nozzle 34 and therefore is independent in operation of pressure variation downstream thereof and is dependent solely upon the pressure from the compressor of engine 13 and is of selected flow capacity to provide conditioned air to the compartment 14 between maximum and minimum rate limits at all times. It is also important that the pumping capacity of fan 40 is below the minimum mass flow rate limit of air-conditioning system 13–34. Accordingly, the rate of flow through compartment 14 is determined by engine performance.

A modification of our air-conditioning system 10 is shown in FIG. 2. In this modification, compartment 14 is positioned adjacent compartment 16, which may be an electronics bay or the like, which needs minimal air-conditioning treatment at all times. In the FIG. 2 construction, air-conditioning system 10 is otherwise as shown in FIG. 1 except that after passing through compartment 14, the conditioned air passes through orifice 52 and then through compartment 16 due to the conditioned airflow action occuring through fan-exhaust outlet 40–48 and/or pressure relief valve 50.

Pressure relief valve 50 is shown in greater particularity in FIG. 4 and includes a plurality of flapper segments 51, 53, 55, and 57 which are shaped to form a circle when each is spring biased by springs such as 59 to their FIG. 4, closed positions. Segments 51–57 are located in the wall of compartment 14 and are responsive to the pressure therewithin so as to pivot about springs 59 when the compartment pressure exceeds the spring closing force and thereby forms and opening in the compartment wall to bleed compartment pressure. The segments 51–57 resume their closed FIG. 4 positions when compartment pressure is below the selected safe limit as determined by the force of springs 59. This construction of valve 50 causes the system to be fail-safe in that valve 50 cannot fail in the closed position of FIG. 4. If the fan 40 should fail or if orifice 48 is some how blocked, the failed pressure relief valve 50 will remain responsive to compartment pressure and would prevent excessive buildup within the compartment 14.

The operation of air-conditioning system 10 and basis for the selection of fan 40 is shown in greater particularity in FIG. 3 in which pressure difference ($\Delta P$) across fan 40 is plotted against volumetric flow rate of the air-conditioning system 10. At this point it is important to realize that the curve A for fan 40 represents only one of a large family of operating fan curves, but this particular curve has been selected as exhibiting zero mass flow at the precise value of the minimum output flow of the air-conditioning unit. In the FIG. 3 graph it will be noted that the maximum air-conditioning unit flow rate is indicated to be 500 c.f.m. (cubic feet per minute) and that the minimum air-conditioning unit flow rate is indicated to be 200 c.f.m. As previously explained, air-conditioning unit flow rate depends upon and is a function of engine operating performance only. The operating characteristics of fan 40 is shown as line A on the FIG. 3 graph and it will be noted that there is a pressure rise across the fan in the operating range from 0 to 200 c.f.m., the minimum flow rate, or preferably just below 200 c.f.m., and that there is a pressure drop across the fan in the operating range between 200 c.f.m. and the 500 c.f.m. maximum air-conditioning unit output. Accordingly, throughout the operating range of the air-conditioning system, fan 40 is operating so that there is a pressure loss thereacross and is said to be operating in a supercharged condition. In effect, fan 40 is undersized for the 200 c.f.m. minimum flow rate of the air-conditioning unit 10.

To preserve the structural integrity of compartment 14, and to provide for human comfort, the pressure relief valve 50 is placed in the wall of compartment 14 in parallel flow relation with fan 40 and prevents the pressure within compartment 14 from exceeding a preselected limit. The operation of fan 40 will therefore follow the dotted line B throughout the major portion of the system operating range. Pressure relief valve 50 is calibrated for the maximum desired pressure in compartment 14 at the maximum air-conditioning unit output limit of 500 c.f.m., station C, and so that fan 40 and pressure relief valve 50 operate in combination in a pressure drop condition along dotted line B so that compartment 14 is pressurized throughout the full operating range of unit 10. FIG. 3 depicts valve 50 as opening at station E, where curve B intersects curve A.

In the event that the air-conditioning system or pressure supply source is rendered inoperative, or a large leak develops so as to prevent the pressurization of the compartment 14, fan 40 will continue to provide airflow through compartment 14. In such a situation that fan will be operating in a normal pressure rise condition as indicated by the curve A from 0 to 200 c.f.m. flow rate. Following this teaching of the careful selection of fan characteristic which match those of the pressure-creating system in the manner defined above, a system is provided wherein standard units of supply can be utilized, and complicated electrical sensors and trigger switches to actuate an otherwise dormant fan can be eliminated. The fan can thus be permitted to operate in a full-time manner.

It will therefore be seen that in selecting the equipment for air-conditioning system 10, a compressor or air pressure source 13 will be chosen which is capable of providing conditioned air between the required maximum and minimum flow rates and the system will be caused to be choked by the use of a choked nozzle such as 34. Fan 40 is then selected so as to be operable in pressure drop condition throughout the full operating range of the system and to some safe point, therebeyond such as station M. Pressure relief valve 50 is selected and/or calibrated so as to reduce compartment pressure to a predetermined point C, which is below the maximum internal pressure allowed, to maintain the structural integrity of the compartment, while the unit is operating at the maximum flow rate.

In the event that compartment 14 is virtually airtight, it is desirable to position filtered inlet 60, which may be pilot operated, in the compartment wall to insure that negative pressure operation is not encountered in the compartment during periods of operation when air-conditioning unit 13-34 is inoperative and fan 40 is operative.

It should further be noted that because fan 40 is an exhaust fan, as opposed to an inlet fan, its operation does not serve to increase the temperature of the air entering the compartment 14.

We wish it to be understood that we do not desire to be limited to the exact details of construction shown and described for obvious modifications will occur to a person skilled in the art.

We claim:
1. An aircraft air-conditioning system including:
    A. a compartment to be air-conditioned and having:
        1. an inlet flow orifice, and
        2. an outlet flow orifice,
    B. an air-conditioning unit operable to selectively condition the air to be furnished to said compartment and operatively connected to said compartment inlet orifice to provide conditioned air thereto and including:
        1. selectively sized flow restricting means,
    C. a pressurized air source operatively connected to provide a pressurized source of air to said air-conditioning unit of selected mass flow rate that the air-conditioning unit will operate in a choked condition due to the sizing of said restricting means and therefore be independent of pressure variation downstream thereof and being of sufficient flow capacity that the mass flow rate of the air-conditioning unit is always above a preselected minimum mass flow rate,
    D. means to maintain a pressurized condition in said compartment over the range of anticipated compartment leakage conditions comprising:
        1. a fan operatively mounted in said outlet orifice and being of selected mass flow pumping capacity less than the mass flow rate of the air-conditioning unit so that a pressure drop exists across said fan at all times.
2. Apparatus according to claim 1 and further including a pressure relief valve operatively mounted in said compartment to relieve compartment pressure when compartment pressure exceeds a preselected limit.
3. Apparatus according to claim 2 wherein said outlet orifice-fan and said pressure relief valve are located in parallel flow relationship in the walls of said compartment.
4. Apparatus according to claim 3 and including a second compartment located with respect to said first compartment so that the flow of conditioned air through said outlet orifice-fan and said pressure relief valve passes through said second compartment.
5. An air-conditioning system including:
    A. a compartment to be air-conditioned and including:
        1. an inlet orifice, and
        2. an outlet orifice,
    B. means to provide conditioned air to said compartment through said inlet orifice at a minimum total flow rate and independent of compartment pressure,
    C. means to produce a positive pressure in said compartment throughout the range of compartment anticipated leakage conditions including:
        1. fan means located in said compartment outlet orifice and of selected mass flow rate pumping capacity less than said minimum total flow rate so that a pressure drop exists across said fan during operation of said air providing means.
6. Apparatus according to claim 5 and further including a pressure relief valve mounted in parallel flow relationship with said fan in the walls of said compartment.

7. Apparatus according to claim 6 and including a second compartment positioned with respect to said first compartment so that the conditioned airflow from said fan and said pressure relief valve passes through said second compartment.
8. Apparatus according to claim 5 wherein said fan is continuously operative and draws air through said compartment when said conditioned air providing means is inoperative.
9. Apparatus according to claim 8 and including an emergency air inlet in said compartment to admit air into said compartment when said conditioned air providing means is inoperative.
10. Apparatus according to claim 9 wherein said emergency inlet is filtered.
11. An air-conditioning system including:
    A. a compartment to be air-conditioned and including:
        1. an inlet orifice and
        2. an outlet orifice,
    B. means to provide conditioned air to said compartment through said inlet orifice between maximum and minimum total flows rates and independent of compartment pressure,
    C. means to produce a positive pressure in said compartment throughout the range of anticipated compartment leakage including:
        1. fan means located in said compartment outlet orifice and of selected mass flow rate pumping capacity less than said minimum total flow rate so that a pressure drop exists across said fan and said fan is operating at supercharged condition at all times.
12. Apparatus according to claim 11 wherein said compartment has a maximum internal pressure structural integrity limit and including:
    A. a pressure relief valve operatively mounted in said compartment in parallel flow relationship with said fan means and being biased to a closed position and actuatable at a preselected compartment internal pressure below said structural integrity limit compartment internal pressure so that said pressure relief valve will actuate to reduce compartment pressure when compartment pressure exceeds a preselected pressure.
13. An air-conditioning system including:
    A. a compartment to be air-conditioned having a maximum internal pressure structural integrity limit and including:
        1. an inlet orifice, and
        2. an outlet orifice,
    B. means to provide conditioned air to said compartment through said inlet orifice between maximum and minimum total flow rates and independent of compartment pressure,
    C. means to produce a positive pressure in said compartment throughout the range of anticipated compartment leakage including:
        1. fan means located in said compartment outlet orifice and of selected mass flow rate pumping capacity less than said minimum total flow rate so that a pressure drop condition exists across said fan at all times when said conditioned air providing means operates between said maximum and minimum flow rates,
    D. a pressure relief valve operatively mounted in said compartment in parallel flow relationship with said fan means and being biased to a closed position and calibrated to open at a compartment internal pressure somewhat below said structural integrity limit when said conditioned air providing means is operating at said maximum flow rate and at a pressure between said maximum and minimum flow rates to maintain said fan means in said pressure drop condition.
14. In combination:
    A. a compartment,
    B. means for maintaining a pressure differential between the interior of said compartment and the exterior environment including:
        1. a compartment inlet,
        2. a compartment outlet, 3. a pressure relief valve located in parallel flow relation with said outlet in said compartment,
4. a pressure source operative to flow pressurized air through said compartment inlet and said compartment throughout a range of volumetric flow rates having a preselected minimum, and
5. fan means located in said output and sized to operate with zero pressure rise thereacross at said minimum volumetric flow rate.

* * * * *